Figure 1:
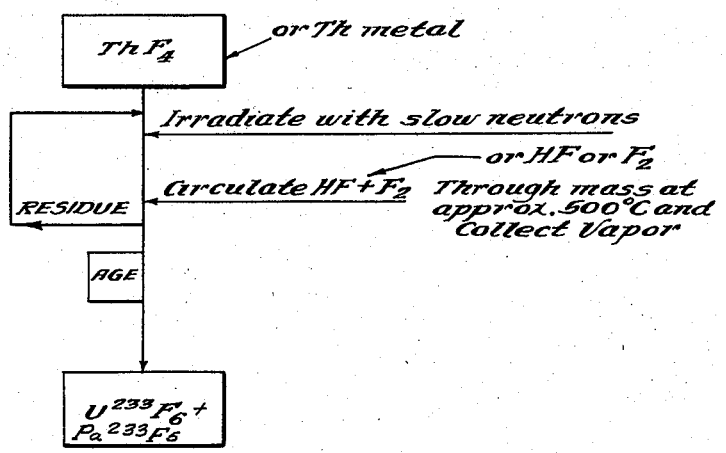

May 19, 1959 G. T. SEABORG ET AL 2,887,357
DRY FLUORINE SEPARATION METHOD
Filed Nov. 3, 1944

CONTINUOUS PROCESS

BATCH PROCESS

INVENTOR.
Glenn T. Seaborg
John W. Gofman
Raymond W. Stoughton
By: Roland A. Anderson
Attorney.

United States Patent Office 2,887,357
Patented May 19, 1959

---

2,887,357

DRY FLUORINE SEPARATION METHOD

Glenn T. Seaborg, Chicago, Ill., John W. Gofman, Berkeley, Calif., and Raymond W. Stoughton, Oak Ridge, Tenn., assignors to the United States of America as represented by the United States Atomic Energy Commission Application November 3, 1944, Serial No. 561,833

9 Claims. (Cl. 23—14.5)

The invention relates to the preparation of masses and compositions of the isotope of uranium having a mass number of 233, said isotope being designated as $_{92}U^{233}$ or $U^{233}$.

An object of the invention is to provide an improved method for preparing and isolating $U^{233}$ in substantially pure or at least highly concentrated form.

Other objects and advantages of the invention will become apparent as the following detailed description progresses.

In this specification and claims the name of the element is used to designate the element generically, either in its elemental state or combined in a compound, unless otherwise indicated by the sense in which it is used or by a specific designation such as "metal" or "elemental."

It is known that the bombardment of thorium with fast neutrons having energies of above about 2 million electron volts (2 m.e.v.) results in a fission of the thorium.

We have discovered that the bombardment of thorium with neutrons having energies of below 1 million electron volts (1 m.e.v.) results in the production of $Pa^{233}$ and ultimately of $U^{233}$ through the decay of $Pa^{233}$, and further we have found that $U^{233}$ undergoes fission with neutrons of such low energies.

The reaction of thorium with slow and moderately fast neutrons may be summarized as follows:

$$_{90}Th^{232} + _{0}n^{1} \longrightarrow {_{90}Th^{233}} + \gamma$$

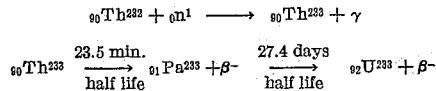

The production of $U^{233}$ and $Pa^{233}$ in substantial amounts and in concentrated form thus is complicated by the fact that the neutron bombardment causing formation of $U^{233}$ and $Pa^{233}$ may also cause decomposition of the $U^{233}$ formed. In accordance with the invention we have found that $U^{233}$ and $Pa^{233}$ may be formed in recoverable amounts by controlling the degree of neutron bombardment so that $U^{233}+Pa^{233}$ is produced within controlled limits.

Since the amount of $Pa^{233}+U^{233}$ which may be produced is small compared to the amount of thorium present, the recovery of the formed isotope is quite difficult. In accordance with the present invention we have found that $Pa^{233}$ and/or $U^{233}$ may be effectively separated as fluorides from neutron-irradiated thorium. The process may be especially effectively conducted by irradiating thorium fluoride with neutrons and subsequently heating the irradiated product to a temperature at which the fluorides of $Pa^{233}$ and $U^{233}$ are successively or simultaneously volatilized and removed while retaining the thorium primarily in the solid state. If desired, thorium metal, or thorium oxide, hydroxide, carbonate or other compound may be irradiated, and the irradiated mass may be converted to fluoride and heated to vaporize the $Pa^{233}$ and/or $U^{233}$ as fluorides.

The fission products which are produced as a result of the fission of $U^{233}$ with slow and moderately fast neutrons are, so far as we have been able to determine, the same as those produced by the fission of $U^{235}$. They consist of a large number of elements which generally fall into a light group with atomic numbers from 35 to 46 incl. and a heavy group with atomic numbers from 51 to 60 incl., and which undergo beta decay. The fission products which have a half life of more than three days will remain in the reaction mass in substantial quantities at least one month after the termination of the reaction, and the removal or elimination of these products by our process is particularly advantageous. Among these products are: Sr, Y, Zr, Cb, Ru, Te, I, Xe, Cs, Ba, La, and Ce of a 20-day half life, and Ce of a 200-day half life.

The reaction of thorium with neutrons to produce $Pa^{233}$ and $U^{233}$ may be carried out with neutrons from any suitable neutron source. Where the neutron source provides fast neutrons of above 1 m.e.v., the fast neutrons are slowed to neutrons having energies of below 1 million electron volts by interposing neutron-slowing material between the fast neutrons and the thorium. Such neutron-slowing materials include carbon-containing, deuterium-containing, or hydrogen-containing material, for example, graphite, paraffin, water, and heavy water. Sufficient neutron-slowing material is used so that at least a majority of the neutrons are slowed to energies of below about 1 million electron volts, since at higher energies there is very little production of $U^{233}$ and considerable fission of the thorium. We may interpose the neutron-slowing material between the fast neutrons and the thorium-containing mass, or we may admix neutron-slowing material with the thorium.

In order to ensure production of $U^{233}$ in a form recoverable in a concentrated state, the thorium subjected to treatment preferably is substantially free or contains but negligible amounts of natural uranium. In any case the amount of natural uranium present should not be in excess of 20 percent by weight of the $U^{233}$ produced and production of $U^{233}$ should be continued until at least 80 percent by weight of the total uranium content is $U^{233}$. Generally speaking, the natural uranium content should not exceed about one part by weight per million parts by weight of thorium and preferably should be no more than one part in ten million parts of thorium.

While neutrons obtained from any suitable neutron source may be used for bombardment of thorium in accordance with the present invention, it is desirable to subject the thorium to neutrons from a high-intensity source capable of supplying more than $10^{15}$ neutrons per second in order that suitable concentrations of $Pa^{233}$ and $U^{233}$ may be obtained in a reasonable length of time.

Preferably the thorium is subjected to slow neutrons from a neutron source capable of supplying at least $5 \times 10^{17}$ neutrons per second, and in order to secure a comparatively high concentration of $U^{233}+Pa^{233}$ it is desirable to subject no more than 20 tons to such a bombardment. This body of thorium should be of sufficient thickness to absorb not less than 50 percent and preferably 75 percent or more of the neutrons so supplied. Thorium 15 centimeters in depth is usually sufficient. Such high neutron intensity may be obtained by subjecting thorium to the action of neutrons obtained by slowing down secondary neutrons obtained from a self-sustaining chain reaction of $U^{233}$, $U^{235}$ or $94^{239}$ with neutrons.

By placing the thorium adjacent to a neutron-chain-reacting mass comprising uranium and/or $94^{239}$, in amount sufficient to establish a self-sustaining neutron chain reaction disposed in a neutron-slowing medium such as graphite or $D_2O$, between $5 \times 10^{17}$ and $10^{20}$ neutrons per second are supplied to the thorium, and when at least 50 to 75 percent thereof are absorbed, there is an appreciable and continuous formation of $Pa^{233}$ as the bombardment continues, and an effective concentration of $U^{233}+Pa^{233}$ may be formed within a reasonable time, for example, in one to three months.

Figure 2:
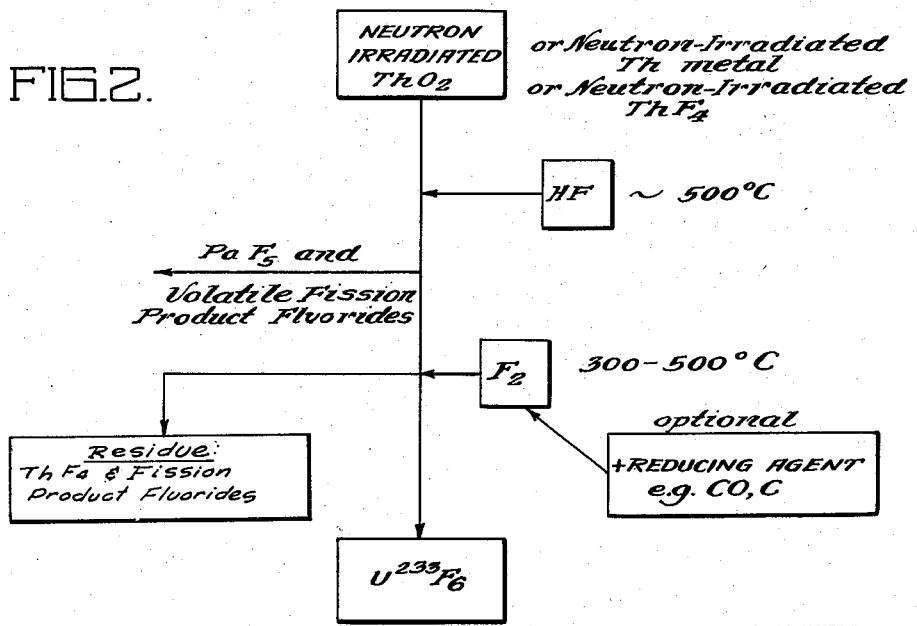

In the drawing, flowsheets, Figures 1 and 2, of two preferred embodiments of the process of our invention are illustrated.

In accordance with one embodiment of our invention we may continuously remove the $Pa^{233}$ as it is formed. Since the $Pa^{233}$ is removed from the zone of neutron bombardment before the formation of any appreciable amount of $U^{233}$, substantially no fissioning of $U^{233}$ takes place, and hence there are substantially no fission products of $U^{233}$ to be separated. Furthermore, when care is taken to keep the neutron energies below that at which fission of thorium occurs (i.e., below about 1 million electron volts) substantially no fission products of thorium will be formed.

In this continuous process (Figure 1), a mass of thorium, for example, in the form of powdered thorium fluoride, is subjected to slow or moderately fast neutrons and at the same time a fluorinating agent, such as hydrogen fluoride and/or fluorine, at a temperature of about 500° C. is circulated through the mass of thorium fluoride. Instead of thorium fluoride we may employ other suitable compounds of thorium which are convertible to thorium fluoride under the conditions obtaining in the reaction zone. Metallic thorium may be employed when the fluorinating agent includes reactive amounts of elemental fluorine. The $Pa^{233}$ formed as a result of the neutron bombardment of $Th^{232}$ is converted in the presence of the fluorinating agent into a volatile fluorine-containing compound of $Pa^{233}$ which volatilizes away from the thorium fluoride and may be collected in a separate chamber where its $Pa^{233}$ content may be allowed to decay to $U^{233}$. Thus, substantially pure $U^{233}$ fluoride may be obtained. Care must be taken in the concentration of $U^{233}$ into a single body that the body is not so large that the $U^{233}$ in the body will spontaneously undergo a self-sustaining nuclear chain reaction with neutrons. In the present case, it is believed, a pure mass of $U^{233}$ metal or compounds of less than 5 pounds may be safely isolated in a single mass in the form of a sphere and for masses in shapes other than spherical considerably larger masses may safely be isolated.

In the above procedure the $Pa^{233}$ produced as a result of the neutron bombardment of $ThF_4$ probably exists as $PaF_4$ in a highly reactive state. This will readily react with elemental fluorine to produce $PaF_5$, and any $UF_4$ present will also convert to $UF_6$ and volatilize with the $PaF_5$.

Where HF is used as the fluorination agent, it is believed that the $PaF_4$ in its highly reactive condition reacts with HF to produce $PaF_5$ and $H_2$, but there may also take place a reaction of $PaF_4$ with any oxygen present to produce $PaOF_3$ which in turn reacts with HF to produce $PaF_5$ and $H_2O$. In any event the HF is operative to remove $Pa^{233}$ from the reaction mass in the form of a volatile fluorine-containing compound. Accordingly, we do not wish to be restricted in any way to the theory or exact mechanism of the reaction.

Due to the inevitable decay of $Pa^{233}$ to $U^{233}$, a slight but appreciable amount of $U^{233}$ may be formed in the reaction mass undergoing neutron bombardment before the $Pa^{233}$ can be removed from the neutron bombardment zone by the action of the fluorinating agent. When hydrogen fluoride alone is employed as the fluorinating agent, the residual $U^{233}$ will not be removed from the irradiated thorium mass due to the relative non-volatility of the resulting tetrafluoride of $U^{233}$. Hence, after some time of operation, the thorium fluoride may contain small amounts of fission products accumulated from fissioning of the $U^{233}$. Under such circumstances, it may be desirable from time to time to purify the thorium fluoride from fission products that have not volatilized with the $Pa^{233}F_5$, or $Pa^{233}OF_3$ or the like. If, however, the thorium mass undergoing neutron bombardment is treated with fluorine or with a mixture of fluorine and hydrogen fluoride as the fluorinating agent, then any minute quantities of $U^{233}$ formed in the thorium mass will be removed with the protoactinium, e.g., as the relatively volatile hexafluoride of $U^{233}$, and consequently fission products from $U^{233}$ will be reduced to a minimum.

A modification of the above continuous method is a batch method for the separation of the $Pa^{233}$ and/or $U^{233}$ from the thorium after a period of neutron bombardment (Figure 2). In this procedure irradiated thorium oxide or thorium metal (if any other thorium compound such as thorium acetate or carbonate were used, it may be converted, for example, to the oxide or to the metallic state as the first step in this chemical extraction procedure) is treated with hydrogen fluoride at about 500° C. so as to convert the thorium oxide to the fluoride. The protoactinium fluoride and some of the radioactive fission products of $U^{233}$ are volatilized away as volatile fluorides during this procedure. The $Pa^{233}$ of the protoactinium fluoride thus obtained decays to $U^{233}$. Next, fluorine is passed over the residual mixture of thorium and $U^{233}$ fluorides, at a temperature of 300 to 500° C., thereby converting the $U^{233}$ to the hexafluoride which then volatilizes away from the thorium fluoride and from the remainder of the fission products, although it is possible that a small fraction of these remaining fission products may come over as volatile fluorides. The fluorination may be aided by conducting the reaction in the presence of a reducing agent, such as carbon monoxide or carbon, which may be maintained in the presence of the oxide undergoing treatment. Agitation of the fluoride mixture during the passage of the fluorine over it is useful to expedite the removal of the $U^{233}$ as volatile hexafluoride in this step. The volatile $U^{233}$ hexafluoride so obtained is very free from other material and thus is in a concentrated state which is entirely or at least more than 50 percent by weight of the hexafluoride. This hexafluoride which condenses to a solid state may be kept as such or converted into soluble uranyl fluoride by bubbling through water. The thorium fluoride may be converted back to the oxide by well known methods for further use in the process. It should be noted, however, that in this method for the extraction of $U^{233}$, we may suitably have the neutron-absorbing thorium mass in the form of the fluoride. This makes possible a very simple cyclic process in which the thorium fluoride, after the absorption of a number of neutrons so as to contain an appreciable amount of $Pa^{233}$ and $U^{233}$ (the relative amounts of these substances depending upon the time allowed for beta decay) may be treated successively with hydrogen fluoride and fluorine so as to remove the $Pa^{233}$ and $U^{233}$ as fluorides, and the thorium fluoride is then ready for neutron bombardment again. Relatively non-volatile fission products of $U^{233}$ the concentration of which will increase in the thorium fluoride mass may be removed periodically, if desired. Make-up thorium fluoride may be added, as desired.

In conducting the batch process, it is preferable to terminate the reaction between the neutrons and the thorium prior to the time when the neutrons are absorbed by the $U^{233}$ at the same rate that they are absorbed by the $Th^{232}$. This limit is approximately when the ratio of $U^{233}$ to the unreacted $Th^{232}$ is 1 to 100. In other words, the reaction of $Th^{232}$ with neutrons should preferably be terminated before the amount of $U^{233}$ is approximately 1 percent of the amount of thorium present in the mass. When the reaction is substantially terminated at or prior to this point, there is also no danger during the reaction of a substantial decomposition of the $U^{233}$ taking place by a nuclear self-sustaining chain reaction.

It is generally desirable to terminate the reaction of the neutrons with $Th^{232}$ when the amount of $U^{233}$ is much less than 1 percent of the unreacted amount of $Th^{232}$ in order to reduce the amount of fission products and make it possible to isolate the $U^{233}$ by ordinary chemical means without the use of special means, such as refrigerating devices, radiation shields, special radiation-resistant materials. In order to reduce such special equipment to a minimum and at the same time have a practical amount of $U^{233}$ and $Pa^{233}$ for isolation by the batch process, the reaction is terminated at a ratio of $U^{233}+Pa^{233}$ to $Th^{232}$ of not less than about 1 to 1 million and frequently between about 1 to 10,000 and 1 to 1000.

Frequently the irradiated thorium is permitted to age substantially to permit formation of a larger amount of $U^{233}$ before treatment to separate the $Pa^{233}$ and $U^{233}$. Aging for a period of one or two months is usually sufficient in such cases, and where bombardment has proceeded for a substantial period of time, for example one month, the period of aging may be decreased or even eliminated since sufficient $U^{233}$ may be present. Even in such a case however further aging may be desirable in order to reduce the radioactivity of the product. In this case aging is continued until the preponderant amount of $Pa^{233}$ formed has decayed and frequently until 75 to 80 percent thereof has decayed to $U^{233}$.

By the above methods of isolating $U^{233}$ we are able to obtain masses comprising compounds of $U^{233}$ which are substantially free from fission products and which are substantially pure $U^{233}$ compounds. The $U^{233}$ metal may be produced from suitable compounds thereof by calcium reduction or any of the other known methods for producing uranium metal from compounds of uranium. $U^{233}$ metal or compounds of $U^{233}$ may be shaped into the form of spheres, cylinders, blocks or the like by known methods of shaping uranium metal and compounds.

While there have been described certain embodiments of our invention, it is to be understood that it is capable of many modifications. Changes, therefore, may be made without departing from the spirit and scope of the invention as described in the appended claims, in which it is the intention to claim all novelty in the invention as broadly as possible.

We claim:

1. The method of obtaining $U^{233}$ and $Pa^{233}$ in concentrated form from a mass of slow-neutron-irradiated $Th^{232}$ which method comprises forming protactinium fluoride, the hexafluoride of uranium, and tetrafluoride of thorium by treatment with a fluorine-containing gas, heating these fluorides to approximately 500° C. whereby the protactinium fluoride and the hexafluoride of uranium are volatilized and thus separated from the thorium fluoride, and aging the protactinium whereby $U^{233}$ is formed.

2. The method of producing $U^{233}$ in concentrated form, which comprises subjecting a mass containing $Th^{232}$ to the action of neutrons of less than 1 million electron volts whereby the thorium decays into protactinium$^{233}$ via $Th^{233}$, said original thorium being present in a state in which it is reactive with hydrogen fluoride; subjecting the mass to the action of hydrogen fluoride whereby a protactinium fluoride is formed; removing the protactinium from the reaction mass by heating to about 500° C.; and aging the protactinium whereby it decays to $U^{233}$.

3. The method of producing $U^{233}$ in concentrated form which comprises subjecting a mass containing $Th^{232}$ fluoride to the action of neutrons the majority of which have an energy of below 1 million electron volts while passing a fluorinating agent through the mass at about 500° C. whereby protactinium is obtained as $PaF_5$ via $Th^{233}F_4$ and volatilized as it is formed, and then aging the protactinium whereby $U^{233}$ is formed.

4. The method of claim 3 wherein the fluorinating agent is selected from the group consisting of hydrogen fluoride, fluorine and a mixture of hydrogen fluoride and fluorine.

5. The method of producing $U^{233}$ in concentrated form which comprises subjecting a $Th^{232}$-containing mass to the action of neutrons the majority of which have an energy of below 1 million electron volts while passing a fluorinating agent through the mass at about 500° C. whereby protactinium is obtained as $PaF_5$ and volatilized as it is formed which then disintegrates to $U^{233}$, said $Th^{232}$-containing mass having its thorium present as one substance of a group consisting of thorium-fluoride, thorium oxide and thorium in a state reactive with said fluorinating agent to produce thorium fluoride.

6. The method of claim 5 wherein the fluorinating agent is selected from the group consisting of hydrogen fluoride, fluorine and a mixture of hydrogen fluoride and fluorine.

7. The method of obtaining $U^{233}$ in concentrated form from a mass of slow-neutron-irradiated $Th^{232}$ containing a fluoride of protactinium, the tetrafluorides of uranium and thorium and fission products fluorides which method comprises subjecting the mass to a temperature of about 500° C. whereby, as fluorine-containing compounds, at least a portion of the fission products and all of the protactinium are volatilized but the lower fluorides of uranium and thorium are retained, aging the separated protactinium whereby $U^{233}$ is formed from the protactinium, converting the lower fluoride of uranium remaining in the distillation residue to the hexafluoride by treatment with a fluorine-containing gas, and distilling the uranium hexafluoride formed from the mass at a temperature of between 300 and 500° C.

8. The cyclic method of producing $U^{233}$ in concentrated form which comprises subjecting a mass containing thorium$^{232}$ fluoride to the action of neutrons the majority of which have an energy of below 1 million electron volts, continuing the neutron bombardment until the mass contains an appreciable amount of $U^{233}$ due to the production of $_{90}Th^{233}$ and the decay of the latter successively to $_{91}Pa^{233}$ and $_{92}U^{233}$, treating the mass with hydrogen fluoride and fluorine at from 300 to 500° C. to remove $U^{233}$ as the volatile hexafluoride, and returning the residual thorium fluoride-containing mass for neutron bombardment for production of additional $U^{233}$.

9. The method of obtaining $U^{233}$ in concentrated form from a mass of slow-neutron-irradiated thorium$^{232}$, said mass containing a fluoride of protactinium, the tetrafluorides of uranium and thorium and fission products, fluorides, which method comprises subjecting the mass to a temperature of about 500° C. whereby the protactinium and at least a portion of the fission products are volatilized as fluorine-containing compounds but the lower fluorides of uranium and thorium are retained, aging the separated protactinium fluoride whereby it decays to $U^{233}$ fluoride, converting the lower fluoride of uranium remaining in the distillation residue to the hexafluoride by treatment with a fluoride-containing gas in the presence of a reducing agent, and distilling the uranium hexafluoride formed from the mass at a temperature of between 300 and 500° C.

References Cited in the file of this patent

UNITED STATES PATENTS

| 1,307,153 | Ryan | June 17, 1919 |
| 1,373,038 | Weber | Mar. 29, 1921 |
| 1,434,486 | D'Adrian | Nov. 7, 1922 |
| 2,173,290 | Adamoli | Sept. 19, 1939 |
| 2,206,634 | Fermi et al. | July 2, 1940 |
| 2,756,125 | Abelson | July 24, 1956 |
| 2,780,517 | Fontana | Feb. 5, 1957 |

(Other references on following page)

OTHER REFERENCES

Chem. Abstracts 4, 1949 (1910).
Chem. Abstracts 5, 3772 (1911).
Friend: "Textbook of Inorganic Chemistry," vol. VII, part III, pp. 291–92 (1926), published by Charles Griffin & Co., Ltd., London.
Chem. Abstracts 26, 2113–4 (1932).
Bjerge et al.: Nature, vol. 143, p. 794 (1939).
Hopkins: "Chapters in the Chemistry of the Less Familiar Elements," vol. II, chapter 18, page 7 (1940), Stipes Publ. Co.
Meitner: Nature, vol. 145, pp. 442–3 (1940).
Furner: Physical Review, vol. 57, page 157 (1940).
Seaborg et al.: U.S. Atomic Energy Commission declassified Paper No. MDDC–787 (Apr. 15, 1942), 1 page.